United States Patent Office 2,758,399
Patented Aug. 14, 1956

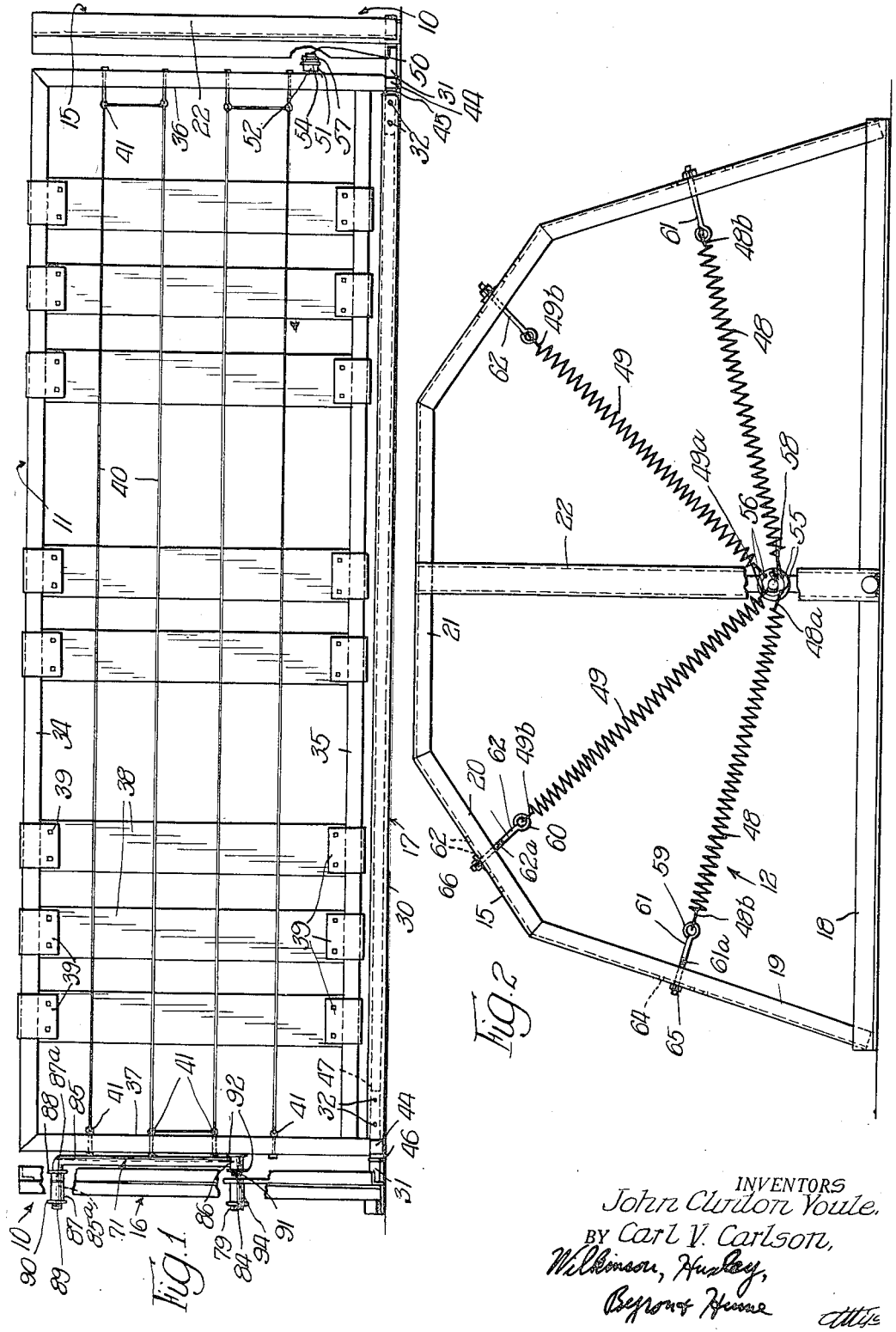

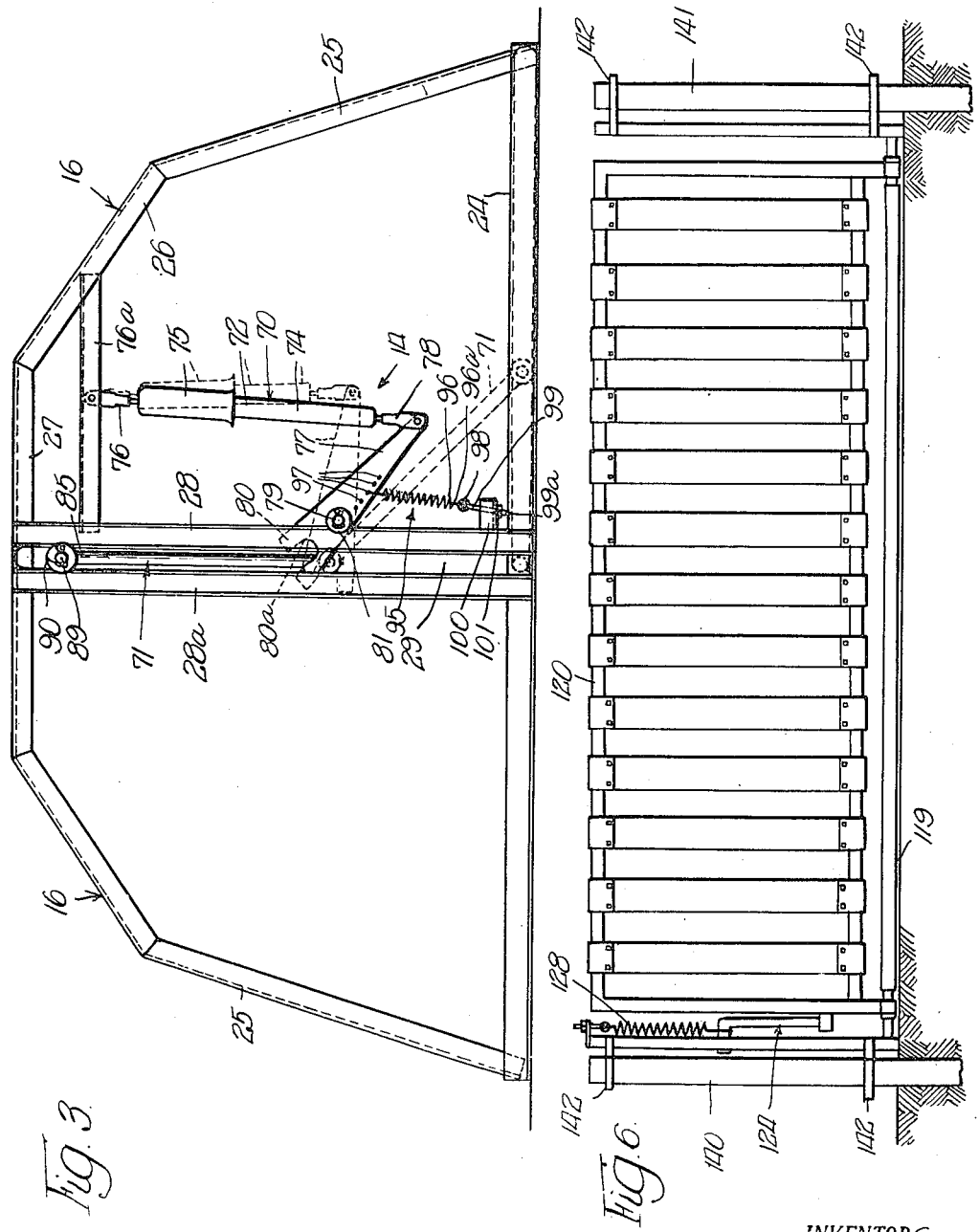

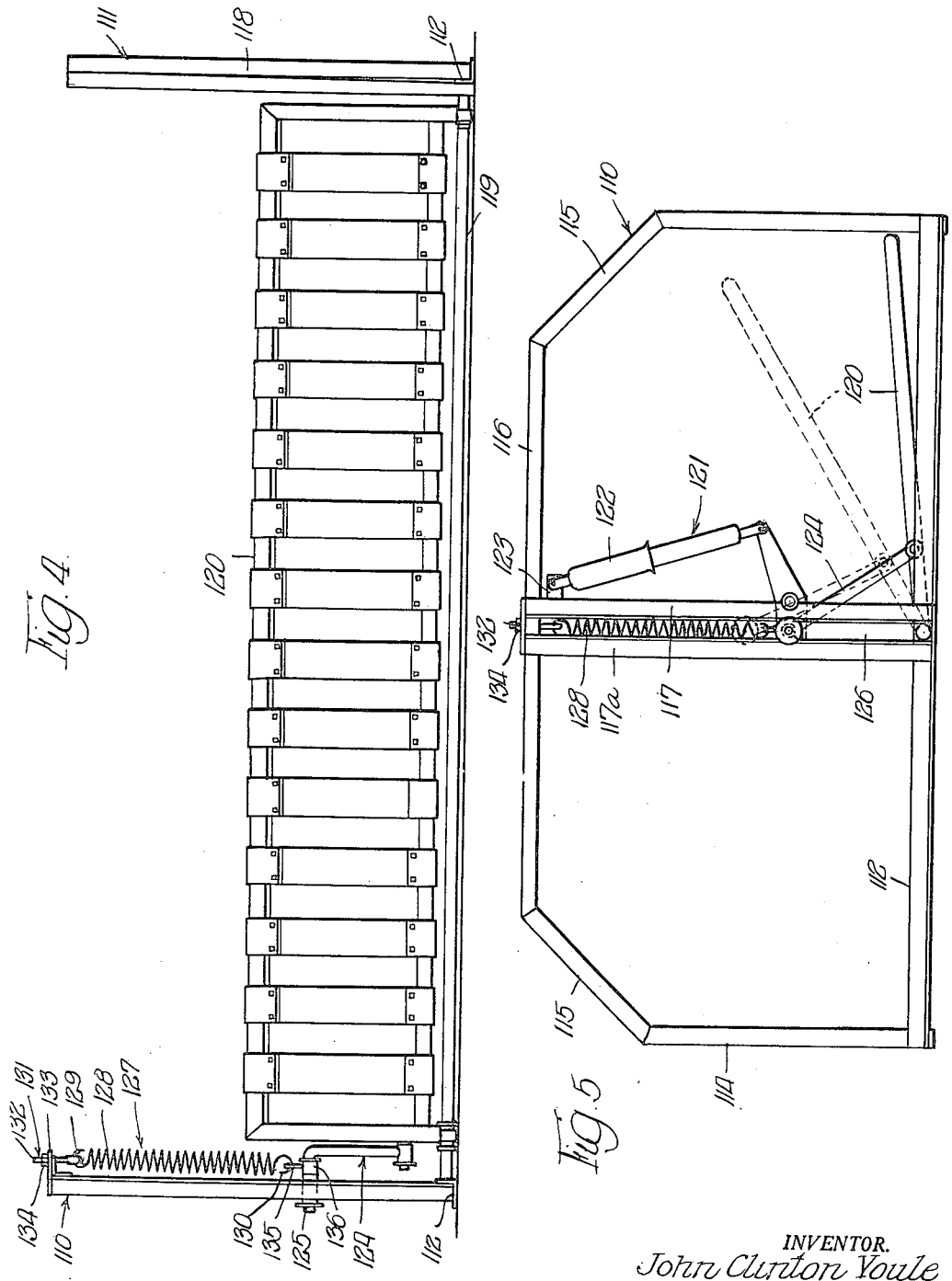

2,758,399

FLUSH IMPACT VEHICLE OPERATED CATTLE GATE

John Clinton Youle, St. Charles, and Carl V. Carlson, Batavia, Ill.; said Carlson assignor to said Youle Application August 12, 1954, Serial No. 449,327

8 Claims. (Cl. 39—5)

This invention relates to a cattle gate of the knockdown type. More particularly, the invention relates to an improved cattle gate for preventing cattle from passing, but allowing vehicles to pass by opening the gate by driving over it, and including means for automatically closing the gate after the vehicle has passed.

It is an object of the present invention to provide an improved automatically operating cattle gate for preventing passage of cattle, but allowing free passage of vehicles.

Another object of the invention is to provide an automatic knock-down type cattle gate including improved means for delaying or damping closing of the gate after the wheels of a vehicle have passed over it.

A further object of the invention is to provide a cattle gate having resilient means for holding the gate in an upright position and allowing the gate to be pivoted to a position flat against the ground by means of force exerted by a moving vehicle to allow the vehicle to pass over the gate and including time delay means to delay upswinging of the gate to make sure that the vehicle which has passed thereover is clear of the gate.

Other objects, features and advantages will be apparent from the following detailed description taken in conjunction with the accompanying drawings, in which:

Figure 1 is a front elevational view of the gate construction according to the present invention;

Figure 2 is an enlarged end elevational view of the gate construction of Figure 1, showing the return spring arrangement;

Figure 3 is an enlarged end elevational view of the other end of the gate construction showing the return damper arrangement;

Figure 4 is a front elevational view of a second embodiment of the gate construction according to the present invention, with the gate portion shown partly flattened;

Figure 5 is an end elevational view of the modified gate construction of Figure 4, showing the return damper arrangement and the return spring arrangement; and Figure 6 is a reduced size front elevational view of a third embodiment of the gate construction according to the present invention.

The improved gate construction of the present invention, as shown in Figures 1-3, includes generally a stationary frame 10, a movable gate 11 pivotally secured to the frame, spring positioning and return mechanism 12, and gate return damper or time delay mechanism 14. The gate 11 is arranged to be normally resiliently held in the upright position shown in Figures 1 and 2 by means of the spring mechanism 12 acting between the frame 10 and the gate. The gate 11 is pivotally secured to the frame at the bottom so that the force exerted by a moving vehicle will pivot the gate to a collapsed horizontal position against the ground to permit the vehicle to pass without making it necessary for the vehicle driver to get out of the vehicle. The damper mechanism 14 acts between the frame 10 and the gate 11 to delay return movement of the gate from its horizontal open position to its vertical closed position after the vehicle has passed over the gate in order to prevent the gate from striking the rear end of the vehicle after the rear wheels have passed.

The stationary frame 10 includes a spring end frame 15 and a damper end frame 16 which are connected by means of a horizontal separator frame 17. The end frames 15 and 16 are held in spaced vertical parallel relationship by means of the frame separator 17.

The end frame 15 includes a horizontal base frame angle 18, a pair of generally upright frame angles 19, one of which is welded at each end of the base frame angle 18, a pair of slanted frame angles 20 which are welded in slanted relationship to the upper ends of the upright angles, and a top horizontal frame angle 21 which is welded at each end to the upper ends of the slanted frame angles. A center post 22, which may be formed from a round pipe or the like, is welded at its bottom end to the center of the base angle 18 and at its top end to the center of the top frame angle 21.

The end frame 16 is similar to the end frame 15 and includes a horizontal base frame angle 24 corresponding to the base angle 18, a pair of upright frame angles 25 corresponding to the angles 19, a pair of slanted frame angles 26 corresponding to the slanted angles 20, and a horizontal top frame angle 27 corresponding to the top angle 21. The various angles of the end frame 16 are welded together in the same manner as the angles of the end frame 15. The end frame 16 is provided with a pair of upright center posts 28 and 28a which are welded at their ends to the frame angles 24 and 27 in spaced parallel relation leaving a vertical slot 29 therebetween extending between the center of the frame angle 24 and the center of the frame angle 27. The center posts 28 and 28a may be expeditiously formed from channels as shown.

The various members of the end frames 15 and 16 may be formed of metal or any other rigid material. The members may be of other configurations as long as the required rigidity is provided.

The frame separator 17 may include an elongated pipe 30 and a pair of end journal or pivot rods 31, one of which is slidably inserted in each end of the pipe 30. The rods 31 are inserted through apertures (not shown) formed through the centers of the base angles 18 and 24 of the end frames 15 and 16, and the rods are welded to the end frames in the horizontal positions shown generally at right angles to the frames at the bottoms thereof. The ends of the pipe 30 are removably secured about the inward ends of the rods 31 by means of spaced pins 32 which are removably inserted through a pair of spaced holes (not shown) formed through each of the pipe end portions and adjacent portions of the rods. Two pins 32 are provided at each end of the pipe 30. Thus the frame separator 17 connects the end frames 15 and 16 and holds them in vertical spaced generally parallel relationship. It will be understood that the base angles 18 and 24 and the frame separator pipe 30 are intended to rest on the ground or the roadway across which the gate extends.

The movable gate 11 is formed primarily of an upper horizontal tubular member 34, a lower horizontal tubular member 35, and a pair of side tubular members 36 and 37 with the side tubular members 36 and 37 being welded at the ends of the horizontal tubular members 34 and 35. A plurality of planks 38 are secured at their ends between the horizontal tubular members 34 and 35 by means of metal straps 39 which are wrapped over the portions of the tubular members adjacent the ends of the planks 38 with the opposite ends of the straps being secured to opposite sides of each of the plank end portions. Thus, the planks 38 are fixedly secured to the horizontal tubular members 34 and 35 generally perpendicular thereto and in the plane defined by the tubular members. Any number of planks 38 may be provided, for example, three at each end portion of the gate and two at the center portion, as shown, in order that the side wheels of a vehicle may readily pass over the gate end portions, with the center planks being provided for rigidity and to accommodate the center wheel or wheels of a tractor or the like. The planks 38 may be formed of hard wood, plastic, metal or the like of sufficient strength to stand up under hard usage.

In order to reduce the size of openings in the gate, to prevent passage of small animals and to give added strength to the gate, tension wire 40 may be laced between a plurality of opposite pairs of eye bolts 41 secured to the opposite side tubular members 36 and 37. Four opposite pairs of eye bolts 41 may be provided, as shown, so that four generally horizontal tension wire strings are provided stretching between the side tubular members. In order to interlace the planks 38, the wire strings may pass in front of the three planks at each end portion of the gate and in back of the two planks 38 at the center portion of the gate. The tension wire 40 is preferably formed of a strong material such as steel which may be galvanized to resist corrosion. It will be understood that the various tubular members of the gate 11 are also formed of a rugged and rigid material such as steel which can be protected against corrosion by painting, galvanizing or the like.

In order to pivotally connect the gate 11 to the frame 10, the bottom end portions of the side tubular members 36 and 37 of the gate are extended beyond the lower tubular member 35, and a short tubular bearing sleeve 44 is welded to the bottom end of each of the side tubular members at right angles thereto. The sleeves 44 are formed for a sliding fit over the rods 31 of the frame separator 17. It will be noted that the horizontal tubular members 34 and 35 of the gate 11 are of sufficient length with respect to the frame separator pipe 30 that the sleeves 44 are spaced beyond the ends of the pipe 30 so that the pipe acts as a spacer to center the gate 11 with respect to the end frames 15 and 16.

In order to allow for relatively large manufacturing tolerances, the length of the gate 11 may be such as to provide a clearance 45 between the bottom end portion of one of the side tubular members, herein shown to be the member 36, with the other tubular member abutting the other end of the pipe 30. A stop spacer 46 may be welded to the rod 31 on the opposite side of the spacer 44 attached to the tubular member 37 so that a minimum of side play between the gate 11 and the frame 10 is provided. The use of the fixed stop washer 46 allows close positioning of the gate with respect to the frame without necessitating close manufacturing tolerances in the over-all construction.

It will be readily seen that the gate 11 is arranged for pivotal movement with respect to the frame 10 from the vertical position shown to a horizontal position against the ground on either side of the frame separator 17. The material of the bearings 44 is thinner than that of the pipe 30 so that they will not bind when the pipe rests on the ground. If desired, tubular spacers 47 can be provided about the rods 31 in the ends of the pipe 30 to give the necessary clearance for the bearings 44.

The gate 11 can be readily detached from the frame 10 for replacement or ease of transportation by removing the pins 32, sliding the frame separator pipe 30 toward the right, as seen in Figure 1, until the pipe is free of the pivot rod 31 at its left end and the sleeve 44 at the left end of the gate is free of the rod 31. Then the gate 11 and the pipe 30 can be moved toward the left to free the pipe and the gate from the other rod 44, moving the gate at a slight angle with respect to the pivotal axis so that the left end of the gate and the left end of the pipe remain free of the left rod 31. It is readily apparent that a different length gate and a different length pipe 30 can be substituted if it is desired to change the distance between the end frames 15 and 16.

The spring positioning and return mechanism 12 is provided for resiliently retaining the gate 11 in its normal closed vertical position and to allow the gate to move to an open horizontal position to permit the passage of a vehicle when the vehicle wheels strike the gate. The positioning and return mechanism may comprise a pair of tension springs 48 and a pair of tension springs 49 with the springs acting between the end frame 15 and the side tubular member 36 of the gate 11.

In order to attach the springs 48 and 49 to the gate 11 a short pivot rod or pin 50 is welded to the lower portion of the tubular member 36 and extends at right angles outwardly therefrom in the plane of the gate. A spring bushing 51 is slidably inserted over the pin 50 and comprises a tubular sleeve portion 52 and an end disk 54 welded to one end of the sleeve to form an annular flange. Hooked ends 48a and 49a of the tension springs are hooked through respective opposite pairs of apertures 55 and 56 formed through the disk 54. A retainer washer 57 is inserted over the outward end portion of the pivot rod 50 to retain the bushing 51 on the rod and to retain the spring ends in the apertures 55 and 56. A cotter pin 58 is inserted through the end of the rod 50 to retain the washer 57 on the rod.

The opposite hooked ends 48b and 49b of the springs 49 are hooked through screw-eye portions 59 and 60 of respective pairs of eye bolts 61 and 62. The eye bolts 61 are provided with threaded end portions 61a adapted to be inserted through one of a plurality of mating apertures 64 formed through the central portion of one of the legs of each of the upright frame members 19 of the end frame 15. A nut 65 is threadedly inserted over the end of the threaded portion 61a to secure the eye bolts 61 to the frame members 19. It will be noted that the tension of the springs 48 can be adjusted by changing the position of the nuts 65 on the eye bolts 61, and the direction of the force exerted by the springs 48 can be changed by positioning the threaded ends 61a of the eye bolts 61 in different apertures 64. The eye bolts 62 are provided with threaded end portions 62a which co-operate with nuts 66 and a plurality of apertures 67 formed through one leg of each of the slanted frame angles 20 to provide for adjustment of the force and angle of exertion of the force exerted by the tension springs 49.

The provision of the two pairs of tension springs acting at different angles insures a positive centering of the gate 11 in the closed upright position. The spring tension adjustments and the spring force direction adjustments provide means for varying the force required to flatten the gate and also provide means for maintaining the normal vertical position of the gate as the springs wear in use.

It will be seen that the gate 11 can be pivoted to the flat or horizontal position in either direction against the tension exerted by the opposite set of tension springs 48 and 49. The lever arm between the pivot rod 50 and the adjacent pivot rod 31 is such, and the tensions in the various springs 48 and 49 are adjusted so that the gate will be normally retained in its vertical position as shown in Figure 1, but will automatically pivot downwardly against the tension of one set of positioning springs in response to the force exerted by the wheels or the bumper of any road vehicle which engage the gate as the vehicle passes between the end frames 15 and 16, and the springs return the gate to its normal vertical position after the vehicle has passed.

The gate return damper or time delay mechanism 14 is provided to prevent immediate upswinging of the gate 11 after a vehicle has passed in order to prevent the gate from striking the overhanging rear end of the vehicle. The mechanism 14 includes a shock strut assembly 70 which is arranged to co-act with an actuating arm assembly 71.

The shock strut assembly 70 includes a shock strut 72 which is of any suitable construction arranged for substantially unimpeded movement in one direction but providing a slow damped movement in the other direction. For example, the shock strut 72 may be of a standard air-oil automotive type as shown in which a piston portion 74 moves relatively freely into a cylinder portion 75, but extension of the piston portion 74 with respect to the cylinder portion 75 is substantially impeded such as by forcing oil to pass through a small orifice (not shown). Since any suitable type of shock strut can be used, it is believed not necessary to describe the shock strut in detail.

The cylinder portion 75 of the shock strut is secured to an attachment member 76 which is pivotally secured at its upper end to a short generally horizontal frame member 76a which is welded at its opposite ends to one of the slanted angles 26 and the channel 28 of the end frame 16. The piston portion 74 of the shock strut 72 is pivotally connected to the outward end of a shock strut lever or arm 77 by means of a connecting member 78. The shock strut lever 77 is provided with a journal rod 79 which is welded at one end at right angles to the lever 77 at a position on the lever adjacent a forked opposite end 80. The journal rod 79 is pivotally disposed in a bearing sleeve 81 which is welded to the outward leg of the channel 28. The bearing sleeve 81 is disposed at right angles to the channel and is located about one-third of the way between the center of the channel and its lower end. A retaining washer 82 is disposed over the free end of the journal 79 and a cotter pin is inserted through the end of the journal to removably retain the sleeve 81 thereon.

The actuating arm assembly 71 includes an elongated L-shaped rod 85 which has a bearing sleeve 86 welded at right angles at the end of its longest leg with the axis of the sleeve being parallel with the other leg of the rod, which other leg forms a journal portion 85a. A pair of roller sleeves 87 and 87a are rotatably disposed on the journal portion 85a and are retained between an inner washer 88, which is welded to the journal portion, and an outer washer 89, which is free of the journal portion and is retained thereon by a cotter pin 90 inserted through the outward end of the journal portion.

The bearing sleeve 86 at the other end of the L-shaped rod 85 is pivotally disposed over a journal rod 91 which is fixedly secured to the tubular member 37 of the gate 11 and extends outwardly therefrom in the plane of the gate in a similar manner to the journal rod 50 which is attached to the tubular member 36. The bearing sleeve 86 is retained on the rod 91 between a pair of washers 92 by means of a cotter pin 94 which is inserted through the free end of the rod.

The outer roller 87 rides in the vertical slot 29 formed between the two frame channels 28 and 28a of the end frame 16, so that the longer part of the rod 85 is in the vertical position shown when the gate 11 is in its normal vertical position. Pivoting of the gate in either direction moves the journal rod 91 in an arc about the frame separator pivots 31 so that the rollers 87 and 87a and the journal end 85a of the actuating arm rod are moved downwardly in the slot 29. The forked end 80 of the strut arm 77 is positioned adjacent the slot 29 below the inner roller 87a, and in the normal position of the strut arm as shown in solid lines in Figure 4, the lower finger of the forked end 80 extends across the slot while the upper finger, which is slightly shorter, extends substantially to the edge of the slot but not beyond. The two fingers of the forked end 80 define a pocket 80a therebetween which is adapted to receive the inner roller 87a.

When the gate 11 is moved to its horizontal position, the rollers, the strut arm and the shock strut assume the positions shown in the dotted lines in Figure 3. The actuating arm roller 87a does not engage the forked end 80 of the strut arm until the gate 11 is almost horizontal on either side. In the last few degrees of downward pivoting of the gate, the roller 87a bears against the lower finger of the forked end 80 of the strut arm, so that the strut arm is moved to the generally horizontal position shown in dotted lines and the roller 87a moves into the pocket 80a, in which position the upper finger of the strut arm restrains upward movement of the roller. Hence, through the actuating arm 71, the upper strut arm finger restrains upward pivoting of the gate 11 until the strut arm has pivoted clockwise (as seen in Figure 3) sufficiently to allow the roller 87a to pass the end of the upper finger of the forked end 80.

The use of the two rollers 87 and 87a prevents excess wear which would result from use of a single roller of the overall length of both. Excess wear in a single roller construction would occur when the forked end 80 of the arm 77 engaged the single roller.

Since the shock strut 72 acts freely in the contracting direction, but is restricted in its speed of movement in the extending direction, the gate moves freely to its horizontal position as a vehicle passes thereover, but the return movement of the gate is restricted until the slow extending shock strut has extended sufficiently to allow the arm 77 to release the roller 87a. When the roller is released, the gate will spring rapidly up to its normal vertical position.

In order to provide means for returning the damper assembly to its normal extended position, as shown in solid lines in Figure 3, a return spring assembly 95 is provided. The return spring assembly 95 includes a tension spring 96 which has its upper hooked end 96a hooked through one of a plurality of apertures 97 formed in spaced relation through the bottom edge portion of the strut arm 77 between the outward end and the journal rod 79. The opposite hooked end 96b of the spring 96 is hooked in an eye-portion 98 of an eye bolt 99 which has a threaded end portion 99a inserted through an attachment bracket 100 which is welded to the portion of the channel 28 below the sleeve 81. An adjustment nut 101 is threadedly inserted over the end of the threaded portion 99a so that the tension exerted by the spring 96 can be varied. The force exerted by the spring 96 tending to extend the shock strut 72 can also be easily varied by positioning the spring end 96a in a different one of the apertures 97. If the spring end is moved closer to the outward end of the strut arm 77, the strut tends to extend more rapidly and the time delay in the closing movement of the gate is shortened. Movement of the hooked end 96a inwardly produces the opposite result.

Normally the gate is resiliently retained in its closed upright or vertical position by means of the spring positioning and return mechanism 12. The resilient force exerted by the spring positioning mechanism is adjustable and the direction of exertion of the forces of the springs 48 and 49 is also adjustable.

When the bumper or front wheels of a vehicle strike the gate 11, the gate pivots from its normal vertical closed position to its flattened or horizontal open position by pivoting on the frame separator journal rods 31 which are located substantially at ground level. One set of return springs 48 and 49 is put under additional tension thus causing a force tending to move the gate back to its normal upright position where the tensions exerted by the respective sets of return springs are equal.

As the gate moves downwardly towards flattened position to allow the vehicle to pass, the actuating arm 71 draws the rollers 87 and 87a downwardly in the slot 29 until the roller 87a engages the lower finger of the forked end 80 of the strut arm 77 in the last few degrees of downward movement of the gate. As the gate continues its downward movement until it is flattened completely, the continued downward movement of the roller 87a causes pivoting of the strut arm 77 to a substantially horizontal position as shown in dotted lines in Figure 3, thus causing contraction of the shock strut 72. Since contracting movement of the shock strut is relatively free, the complete flattening of the gate is substantially unimpeded. It will be understood that the gate can be completely flattened in a very short period of time, depending upon the speed of the vehicle.

As the rear wheels of the vehicle free the gate, it tends to move rapidly upwardly under the influence of the spring positioning and return mechanism 12, but rapid return movement is prevented by action of the gate return damper or time delay mechanism 14. When the gate is completely collapsed, the roller 87a of the actuating arm assembly 71 is restrained from upward movement by the upper finger of the forked end 80 of the strut arm 77. The upward force exerted by the roller 87a and the downward force exerted by the return spring assembly 95 slowly pivot the strut arm 77 in the clockwise direction as seen in Figure 3, as dictated by the damped extension characteristic of the shock strut 72, until the roller is free of the upper finger of the shock strut forked end. As soon as the roller is freed, the gate swings rapidly upwardly to its normal vertical position.

In an actual embodiment of the invention, as shown in Figures 1–3, the time delay caused by the mechanism 14 is between about seven seconds to fourteen seconds with a normal delay of about ten seconds. During this delay period the outward end of the gate moves upwardly only a few inches because of the delay latching performed by the damper mechanism 14, and this time delay is adjustable by means of the spring return mechanism 95. Thus, the gate will not strike the overhanging rear end portion of even a very slow moving vehicle.

The embodiment of Figures 4 and 5 is very much the same as the first embodiment except for the change in the spring return mechanism. The gate construction of these figures includes a pair of end frames 110 and 111 which include base angles 112, pairs of upright angles 114, pairs of slanted angles 115, and horizontal top frame angles 116, which correspond to the respective portions shown in Figures 1–3. The end frame 110 includes a pair of center posts 117 and 117a, and the end frame 111 includes a center post 118. This embodiment of the invention also includes a frame separator 119 on which is pivotally mounted a gate 120.

Gate return damper or time delay mechanism 121 is connected to the end frame 110 in the same manner that the damper mechanism 14 is connected to the end frame 16 of the first embodiment except that the upper end of the shock strut 122 is connected to a bracket 123 which is fixedly secured to the upper end portion of the center post 117 rather than having the upper end of the shock strut connected in the manner shown in the first embodiment. The damper mechanism 121 is operatively associated with the gate 120 through an actuating arm assembly 124. Actuating arm assembly 124 is similar to the actuating arm assembly 71 and is pivotally connected to the gate 120 and has a roller portion 125 slidably associated in a slot 126 formed between the center post 117 and 117a.

It will be seen that the actuating arm assembly dimensions and the pivotal connection with the gate 120 are somewhat varied from the construction of the first embodiment, so that the roller portion 125 is at a lower position in the slot 126 when the gate 120 is in its normal upright position. This change in arrangement is made so that a revised spring positioning and return mechanism 127 can be provided between the upper end of the frame 110 and the roller portion 125 of the actuating arm assembly 124.

The spring mechanism 127 comprises a tension spring 128 having an upper hooked end 129 and a lower hooked end 130. The upper hooked end 129 is connected through the eye portion of an eye bolt 131 with the threaded shank 132 of the eye bolt being inserted through a hole in a bracket 133 which is fixedly secured to the upper center edge of the frame 110. An adjusting nut 134 is threadedly inserted over the shank 132 to adjustably position the eye bolt 131. The lower hooked end 130 of the spring 128 is hooked through an eye 135 which is fixedly secured in laterally extending relation to a sleeve 136 which is pivotally disposed about the inner portion of the roller end 125 of the actuating arm assembly 124. Normally the spring 128 holds the roller portion 125 in its uppermost position so that the gate is resiliently held in its normal vertical position through action of the actuating arm assembly.

When the gate is flattened to move the roller portion 125 downwardly, the spring 128 is extended, and after the time delay period, the spring acts through the actuating arm to return the gate to its upright position. The tension of the spring is adjustable through the threaded eye bolt 131 and the adjusting nut 134.

While the embodiments of the prior figures are shown in connection with portable gate constructions, it will be understood that a permanent arrangement can be provided. Such an arrangement is shown in Figure 6. In this embodiment the end frames are eleminated except for the center posts and these center posts are fixedly secured to a pair of posts 140 and 141 which are solidly set in the ground or the roadway in the spaced upright positions shown. The end posts in this embodiment are fixedly connected to the fixed posts 140 and 141 by means of a plurality of brackets 142 which extend between the upper and lower portions of the fixed posts and the corresponding portions of the end posts of the gate frames. Any suitable type of brackets 142 can be utilized, such as the steel strap arrangements shown, wherein the brackets each comprise a steel strap welded to the center post and wrapped around the fixed post to permanently position the gate frames. Either the embodiment of Figures 1–3 or the embodiments of Figures 4 and 5 can be utilized in the permanent installation arrangement of Figure 6, and the gate construction can be the same as described in connection with those figures except that the frame angles of the end frames are eliminated and the frame separator pipe is eliminated. The operation is exactly the same as previously described.

From the foregoing description it will be understood that the present invention provides a substantially improved cattle gate construction for preventing the passage of cattle or the like, but allowing automatic opening in response to the force exerted by the bumper or wheels of a vehicle to allow the vehicle to pass unimpeded. The improved gate is readily portable and is easily and expeditiously adjustable as to closing time delay, closing force, and closed position. Vehicles can pass the gate with equal ease in either direction. The construction is simple and foolproof and is adapted for expeditious mass production.

Modifications and variations may be effected without departing from the scope of the novel concepts of the present invention.

We claim:

1. In an automatically collapsible gate construction, a pair of end frames, a separator frame connecting said end frames, a gate pivotally secured to said separator frame between said end frames, spring means resiliently holding said gate in a generally vertical position and for allowing movement of the gate against the bias of said spring means to a generally horizontal position in either direction, a pair of generally vertically disposed posts fixedly secured to one of said end frames in spaced relation providing a vertical slot therebetween generally in said vertical plane of said gate, an actuating arm having a portion slidably disposed in said slot and having another portion pivotally secured to said gate, and damper mechanism operatively associated with said first mentioned portion of said arm when said gate is moved into either of said horizontal positions whereby said damper mechanism retains said portion of said arm for a predetermined period of time to prevent movement of the gate back to said vertical position under the influence of said spring means until the end of said predetermined period of time.

2. In an automatically collapsible gate construction, a pair of end frames, a separator frame connecting said end frames, a gate pivotally secured to said separator frame between said end frames, a pair of tension springs pivotally attached at their inner ends to a portion of said gate spaced from said separator frame pivotal connection, means connecting the respective opposite ends of said springs to corresponding opposite portions of one of said frames whereby said springs resiliently retain said gate in a normal upright position and allow movement of said gate to a horizontal position in either direction against the bias of the respective springs, an actuating arm operatively associated with said gate, and damper mechanism engaging said arm when said gate is moved into either of said horizontal positions whereby said damper mechanism retains said arm for a predetermined period of time to prevent movement of the gate back to said vertical position under the influence of said springs until the end of said predetermined period of time.

3. In an automatically collapsible gate construction including a stationary frame and a movable gate pivotally secured thereto and arranged for pivoting between a closed position and open positions, the improvement comprising an actuating arm pivotally secured to the movable gate, said arm having a slide portion slidably engaged with the frame, biasing means operatively associated with the slide portion of said arm and a portion of the frame and arranged for resiliently biasing said slide portion in a direction for causing said arm to resiliently hold said movable gate in its closed position, and time delay damping means operatively associated with said actuating arm for engaging the actuating arm to retain the gate in one of its open positions against the resilient force of said biasing means for a predetermined period of time.

4. In an automatically collapsible gate construction including a stationary frame and a movable gate pivotally secured thereto and arranged for pivoting between an upright closed position and horizontal open positions, the improvement comprising an actuating arm pivotally secured to the movable gate at a position normally above the pivotal connection between the gate and frame, said arm having a slide portion slidably engaged with the frame, biasing means operatively associated with the slide portion of said arm and a portion of the frame and arranged for resiliently biasing said slide portion in a direction for causing said arm to resiliently hold said movable gate in its closed position whereby said gate is adaptable for pivoting toward one of its open positions against the resilient force of said biasing means, and time delay damping means operatively associated with said actuating arm for engaging the actuating arm when the movable gate is in one of its open positions to retain the gate in said open position against the resilient force of said biasing means for a predetermined period of time.

5. In an automatically collapsible gate construction including a stationary frame and a movable gate pivotally secured thereto and arranged for pivoting between an upright closed position and horizontal open position, the improvement comprising an actuating arm pivotally secured to said movable gate and having a slide portion extending generally parallel to the pivotal axis of said gate, a pair of roller sleeves slidably disposed on said slide portion, said frame having structure forming a substantially vertical slot adapted for receiving one of said rollers for permitting antifrictional movement of said slide portion in said slot to accommodate pivotal movement of said gate between said closed position and said open position, and time delay mechanism including damper means and a damper arm operatively associated therewith, said damper arm having a forked end adapted for engaging the other roller when said gate is in one of its open positions for retaining said gate in said open position for a predetermined period of time, whereby said one roller and said other roller operate independently to prevent excess wear.

6. In an automatically operable gate construction, frame structure, a gate pivotally secured to said frame structure normally biased to closed position, actuating means operatively associated with said gate, time delay mechanism carried by said frame structure and including patch means, said actuating means having operative connection to said latch means in the open position of the gate, whereby said time delay mechanism retains said latch means and said actuating means in operative connection for a predetermined period of time to prevent movement of the gate back to said closed position until the end of said predetermined period of time.

7. A gate construction adapted for automatic actuation in response to contact by a vehicle comprising a stationary frame portion, a movable gate portion, an actuating arm having one part slidably restrained with respect to said frame portion and another part pivotally secured to said gate portion, a lever pivotally secured to said frame portion and having an end section engageable and disengageable with said one arm part, and damper means operatively associated with said lever to delay movement thereof for releasing said one arm part for a predetermined period of time whereby closing movement of said movable gate portion is prevented until the end of said predetermined period of time.

8. A gate construction adapted for actuation by a vehicle comprising a stationary frame, a gate movably associated with said frame and operable between a closed position and two open positions, means yieldably biasing said gate to said closed position, time delay mechanism carried by said frame independent of said gate and including a latching device, and an actuating arm having one portion pivotally connected to said gate and another portion operably engageable and disengageable with said latching device, whereby said actuating arm and said latching device are disengaged when said gate is in said closed position and whereby said latching device and said actuating arm are engaged when said gate is moved to either of said open positions to hold the gate open for a limited period of time controlled by said time delay mechanism.

References Cited in the file of this patent

UNITED STATES PATENTS

| | | |
|---|---|---|
| 1,481,666 | Francis | Jan. 22, 1924 |
| 1,551,340 | Smith | Aug. 25, 1925 |
| 1,569,235 | Plungett | Jan. 12, 1926 |
| 2,204,477 | Ebaugh | June 11, 1940 |
| 2,538,470 | Peeples | Jan. 16, 1951 |
| 2,599,211 | Tilbury | June 3, 1952 |
| 2,622,354 | Bacon | Dec. 23, 1952 |
| 2,691,836 | David | Oct. 19, 1954 |
| 2,693,653 | Dean | Nov. 9, 1954 |

FOREIGN PATENTS

| | | |
|---|---|---|
| 452,783 | Great Britain | Aug. 28, 1936 |
| 205,848 | Switzerland | Nov. 16, 1939 |